US009347700B2

(12) United States Patent
Bush

(10) Patent No.: US 9,347,700 B2
(45) Date of Patent: May 24, 2016

(54) LOW AMBIENT COOLING KIT FOR VARIABLE REFRIGERANT FLOW HEAT PUMP

(71) Applicant: Mitsubishi Electric Corporation, Tokyo (JP)

(72) Inventor: Joseph P. Bush, Lawrenceville, GA (US)

(73) Assignee: Mitsubishi Electric Corporation, Tokyo (JP)

( * ) Notice: Subject to any disclaimer, the term of this patent is extended or adjusted under 35 U.S.C. 154(b) by 10 days.

(21) Appl. No.: 14/294,381

(22) Filed: Jun. 3, 2014

(65) Prior Publication Data
US 2014/0260363 A1 Sep. 18, 2014

Related U.S. Application Data

(60) Division of application No. 13/207,275, filed on Aug. 10, 2011, and a continuation-in-part of application No. 12/854,318, filed on Aug. 11, 2010.

(51) Int. Cl.
*F25D 21/00* (2006.01)
*F25D 21/06* (2006.01)
(Continued)

(52) U.S. Cl.
CPC . *F25D 21/06* (2013.01); *F24F 1/06* (2013.01); *F24F 1/48* (2013.01); *F24F 1/56* (2013.01); *F24F 13/14* (2013.01); *F28F 27/003* (2013.01); *Y02B 30/748* (2013.01)

(58) Field of Classification Search
CPC ............... F24F 13/14; F24F 1/06; F24F 1/48; F24F 1/56; F24F 13/10; F24F 13/22; F24F 13/1426; F25D 21/06; Y02B 30/748
USPC ........................................... 62/186, 150, 151
See application file for complete search history.

(56) References Cited

U.S. PATENT DOCUMENTS 2,526,874 A 10/1950 Jones
3,004,402 A 3/1960 Dart et al.
(Continued)

FOREIGN PATENT DOCUMENTS

JP 53-86839 U 12/1976
JP 02-290449 A 11/1990
(Continued)

OTHER PUBLICATIONS

Office Action mailed Aug. 5, 2014 issued in corresponding JP patent application No. 2013-524230 (and English translation).
(Continued)

*Primary Examiner* — Henry Crenshaw
(74) *Attorney, Agent, or Firm* — Posz Law Group, PLC

(57) ABSTRACT

Systems and methods for low ambient air temperature cooling in air-source based heat pump systems wherein an outdoor heat pump unit includes a discharge hood positionable over its fan. The hood including a damper that is openable and closeable as a function of outside temperature. The outdoor unit may also include wind deflectors positioned over the coil openings of the disclosure. During cooling operations below a low outside air threshold temperature, e.g., below 23° F., the damper assembly partially closes to reduce airflow across the condenser coil of the outdoor unit to a level below that which is possible at minimum fan speed. As the outdoor temperature continues to drop, the damper assembly continues to close to further reduce airflow.

8 Claims, 11 Drawing Sheets

(51) Int. Cl.
*F25D 17/04* (2006.01)
*F24F 1/06* (2011.01)
*F24F 1/48* (2011.01)
*F24F 1/56* (2011.01)
*F24F 13/14* (2006.01)
*F28F 27/00* (2006.01)

(56) References Cited

U.S. PATENT DOCUMENTS

| | | |
|---|---|---|
| 2,958,208 A | 11/1960 | Braden |
| 3,011,424 A | 12/1962 | Kohnen |
| 3,148,514 A | 9/1964 | Mathis |
| 3,354,665 A | 11/1967 | Lewis |
| 3,357,199 A * | 12/1967 | Harnish ............... 62/181 |
| 3,366,167 A | 1/1968 | Dapper |
| 3,390,539 A | 7/1968 | Miner |
| 3,402,565 A | 9/1968 | Maynard |
| 3,466,889 A | 9/1969 | Fristoe et al. |
| 3,469,413 A | 9/1969 | Miner |
| 3,500,655 A * | 3/1970 | Lyons ............... 62/183 |
| 3,584,466 A * | 6/1971 | Kaufman et al. ...... 62/183 |
| 3,638,445 A | 2/1972 | Lavigne, Jr. et al. |
| 3,645,107 A | 2/1972 | Quick |
| 3,739,596 A | 6/1973 | Ballard |
| 3,769,810 A * | 11/1973 | Swartwout ............. 62/183 |
| 3,910,345 A | 10/1975 | Whalen |
| 3,958,429 A | 5/1976 | Kirsch |
| 4,120,173 A | 10/1978 | Kimpel |
| 4,149,590 A | 4/1979 | Ospelt |
| 4,280,332 A | 7/1981 | Khan et al. |
| 4,589,475 A | 5/1986 | Jones |
| 4,744,511 A * | 5/1988 | Kakehi ............ G05D 23/2015 165/202 |
| 4,835,976 A | 6/1989 | Torrence |
| 5,117,656 A | 6/1992 | Keck et al. |
| 5,150,581 A | 9/1992 | Smith |
| 5,247,805 A | 9/1993 | Dennis |
| 5,320,167 A * | 6/1994 | Johnson ............. B60H 1/3202 165/61 |
| 5,337,574 A * | 8/1994 | Dick .................... 62/89 |
| 5,974,820 A | 11/1999 | Boyd |
| 6,055,819 A | 5/2000 | Kang |
| 6,099,405 A * | 8/2000 | Cunningham, Jr. .......... 454/228 |
| 6,196,010 B1 | 3/2001 | Mohrman |
| 6,334,321 B1 * | 1/2002 | Said et al. ............. 62/155 |
| 6,688,966 B2 | 2/2004 | Akhtar |
| 6,873,514 B2 | 3/2005 | Maller et al. |
| 7,191,616 B2 | 3/2007 | Kim et al. |
| 7,448,228 B2 | 11/2008 | Han |
| 2003/0085025 A1 | 5/2003 | Woods et al. |
| 2005/0076671 A1 | 4/2005 | Bae |
| 2006/0048525 A1 * | 3/2006 | Cook .................. 62/131 |
| 2007/0023416 A1 * | 2/2007 | Mueller et al. ......... 219/494 |
| 2007/0199338 A1 * | 8/2007 | Evans et al. ............. 62/228.4 |
| 2009/0117843 A1 * | 5/2009 | Palmer .................... F24F 7/06 454/239 |
| 2009/0199581 A1 | 8/2009 | Ushijima et al. |
| 2010/0304627 A1 | 12/2010 | Morvillo |

FOREIGN PATENT DOCUMENTS

| | | |
|---|---|---|
| JP | 05-264155 A | 10/1993 |
| JP | 3067381 U | 1/2000 |
| JP | 2008-064344 A | 3/2008 |
| JP | 2008-116145 A | 5/2008 |

OTHER PUBLICATIONS

International Search Report dated Jan. 13, 2012 in the corresponding international patent application No. PCT/US2011/047419.

Japanese Office Action mailed Jan. 21, 2014 issued in corresponding Japanese patent application No. 2013-524230 (with English translation).

* cited by examiner

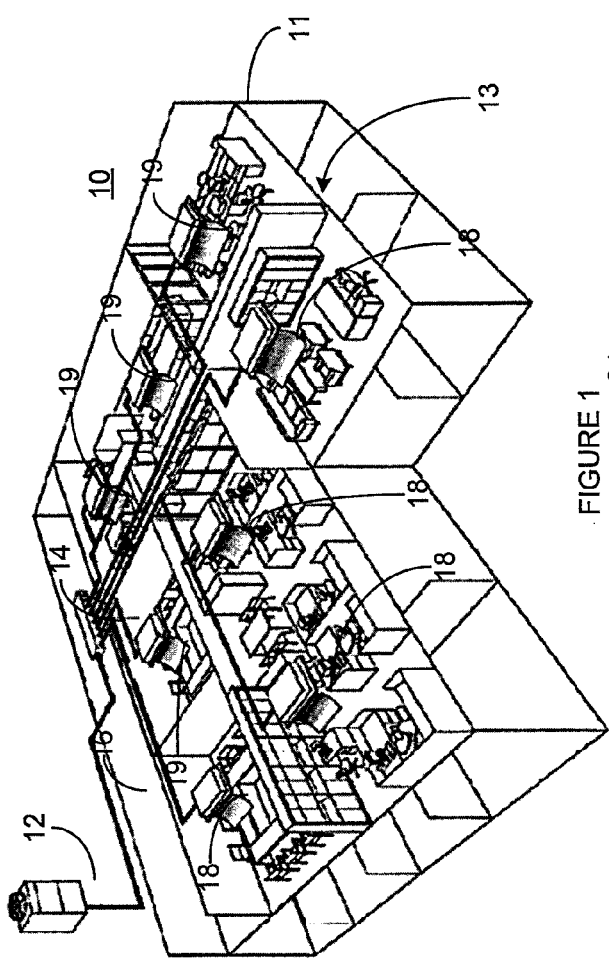
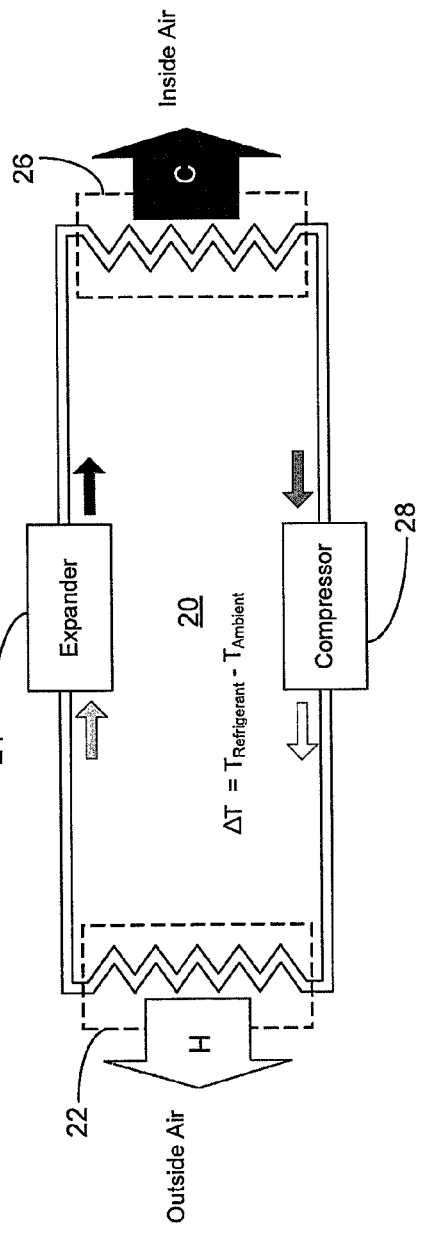
FIGURE 1
FIGURE 2A

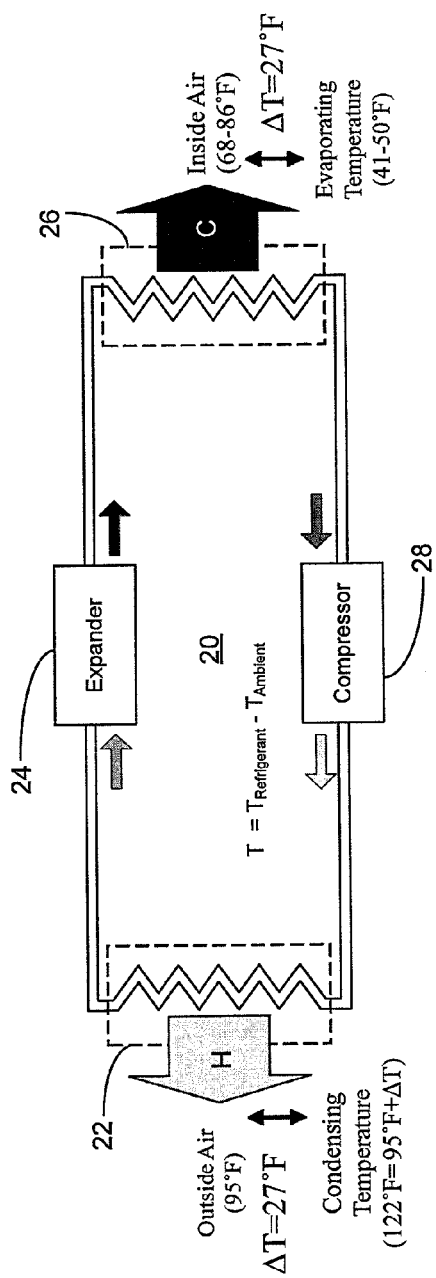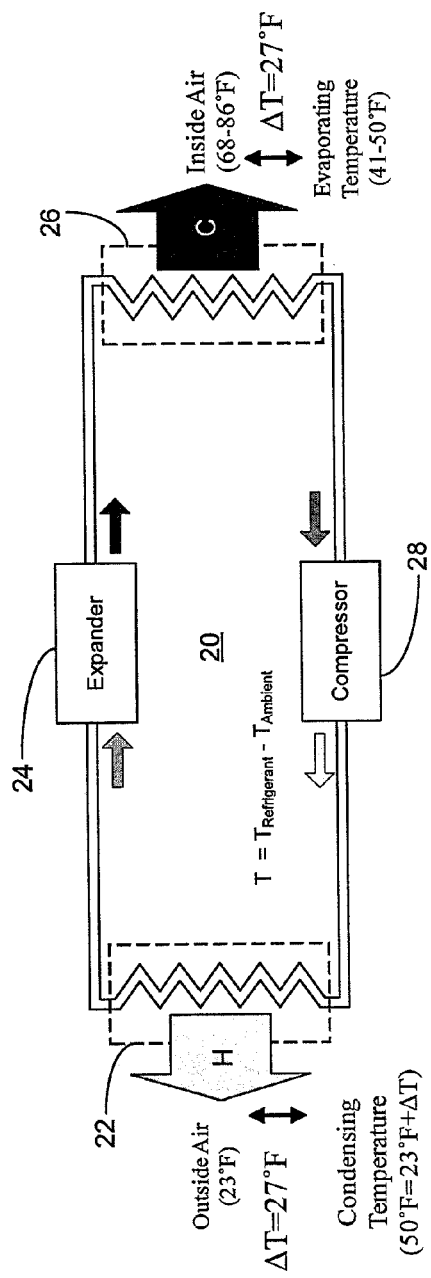

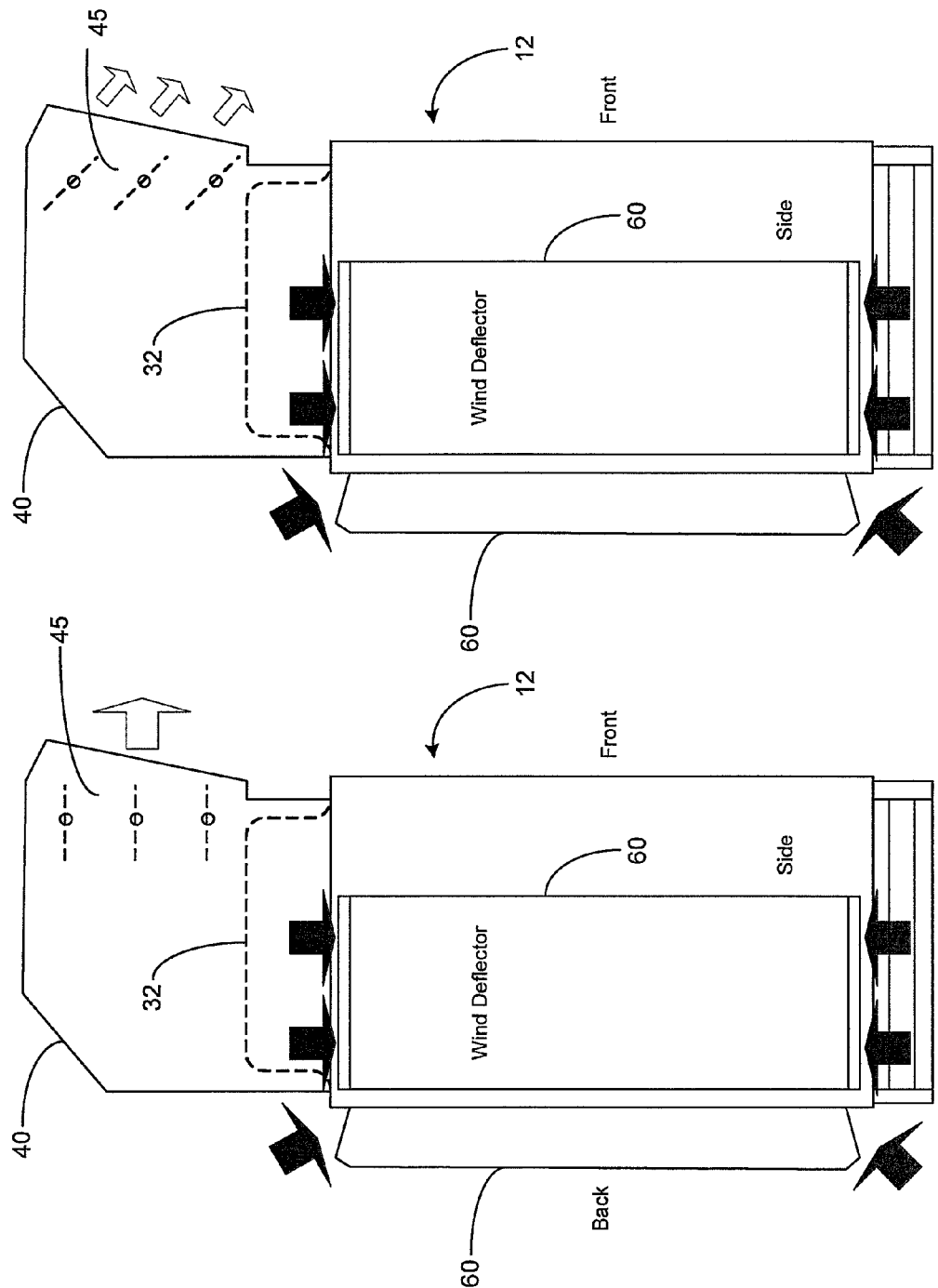

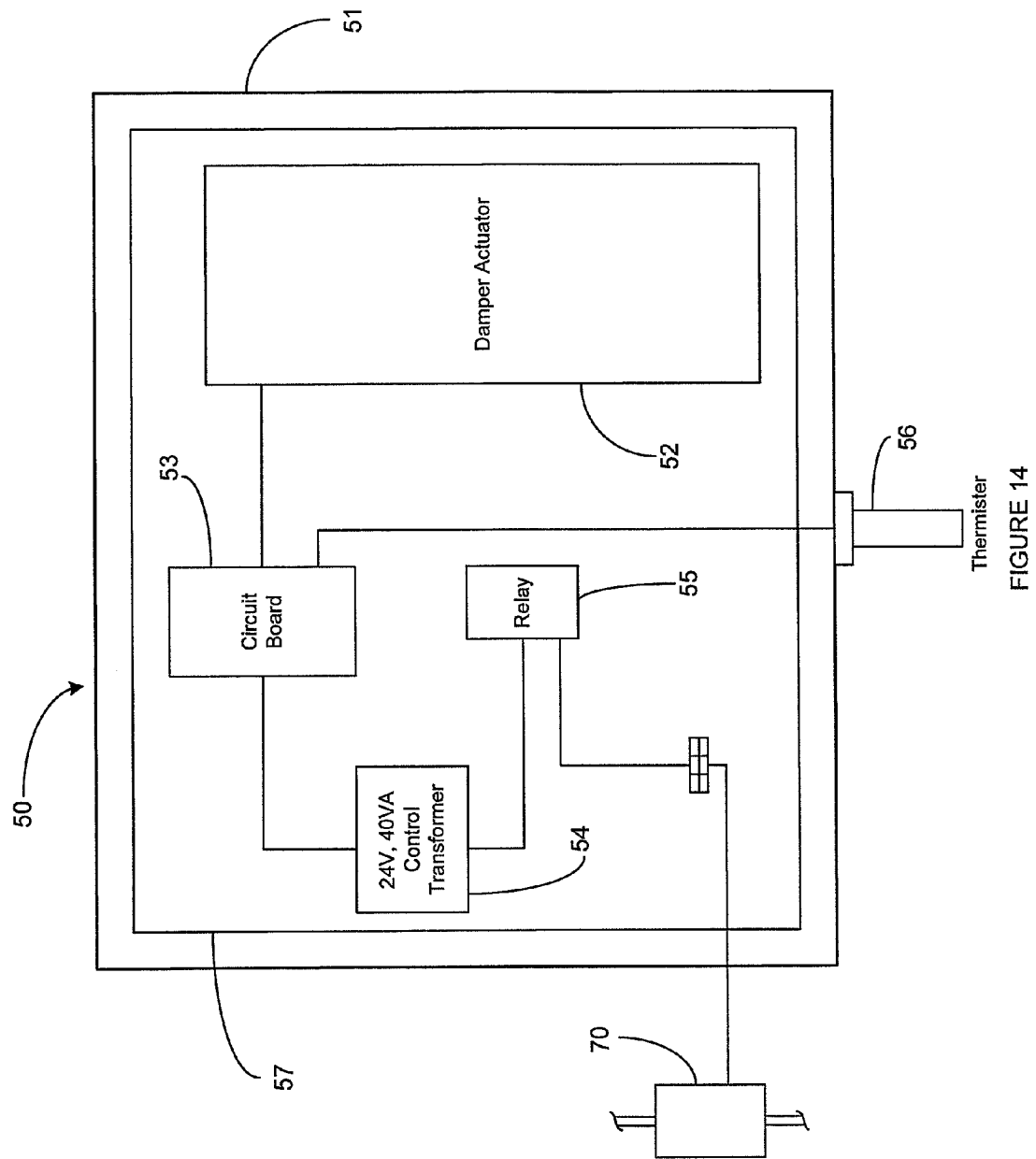

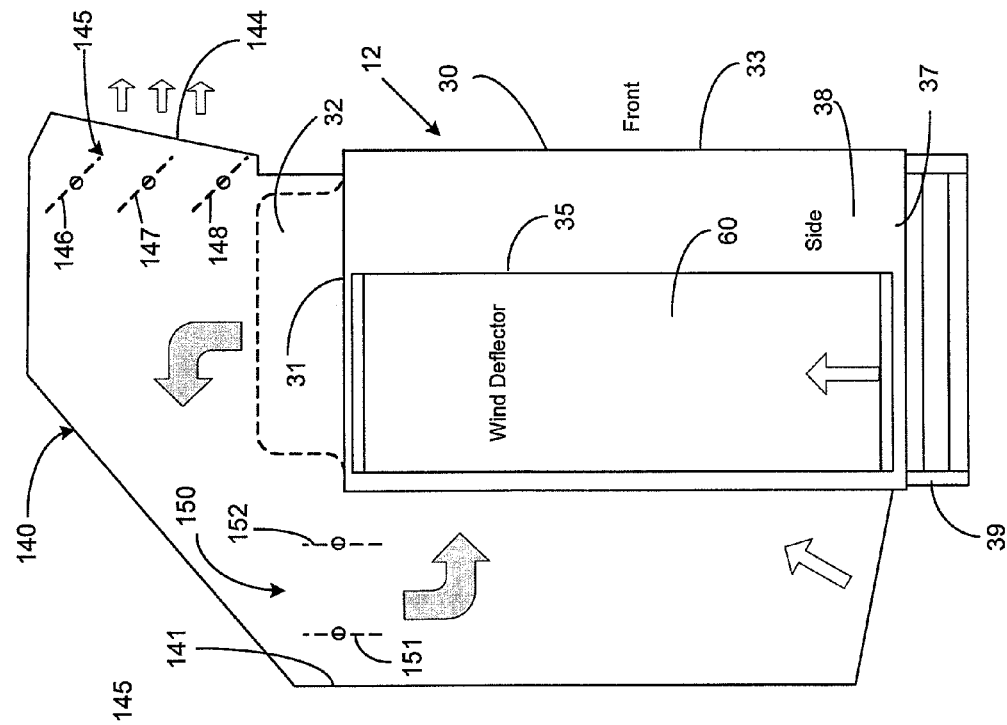
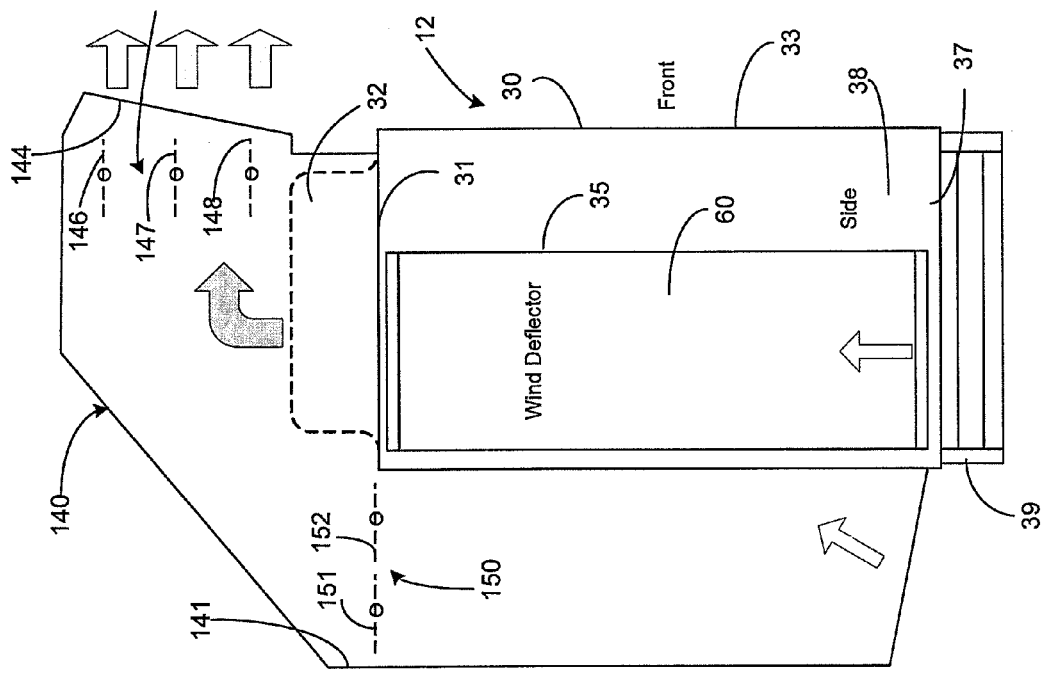
FIGURE 15B
FIGURE 15A

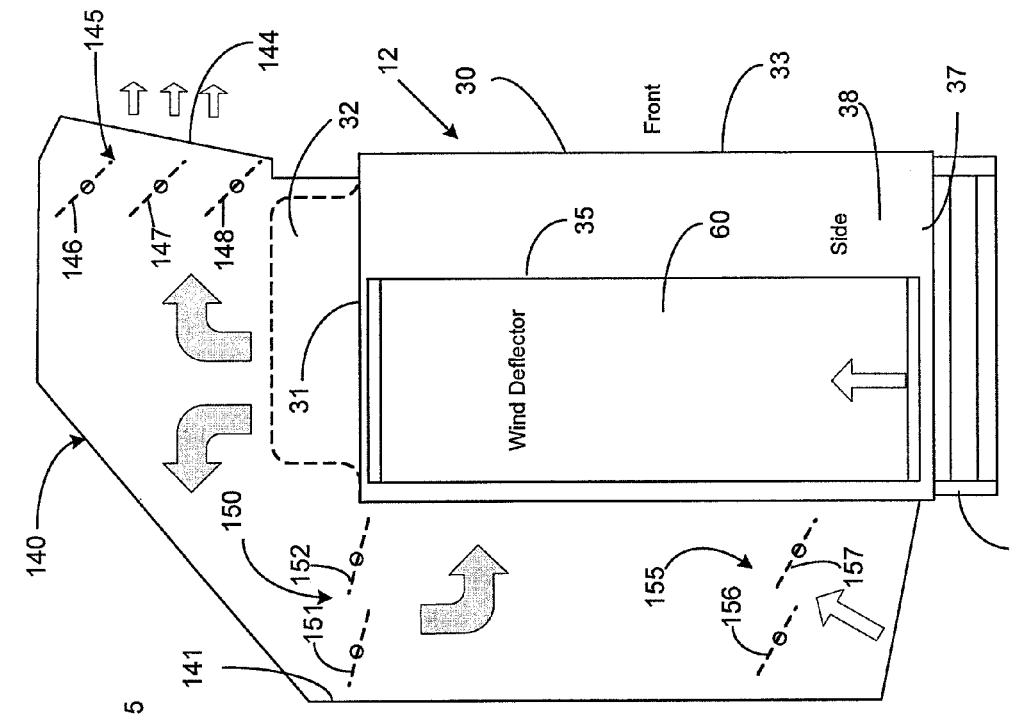
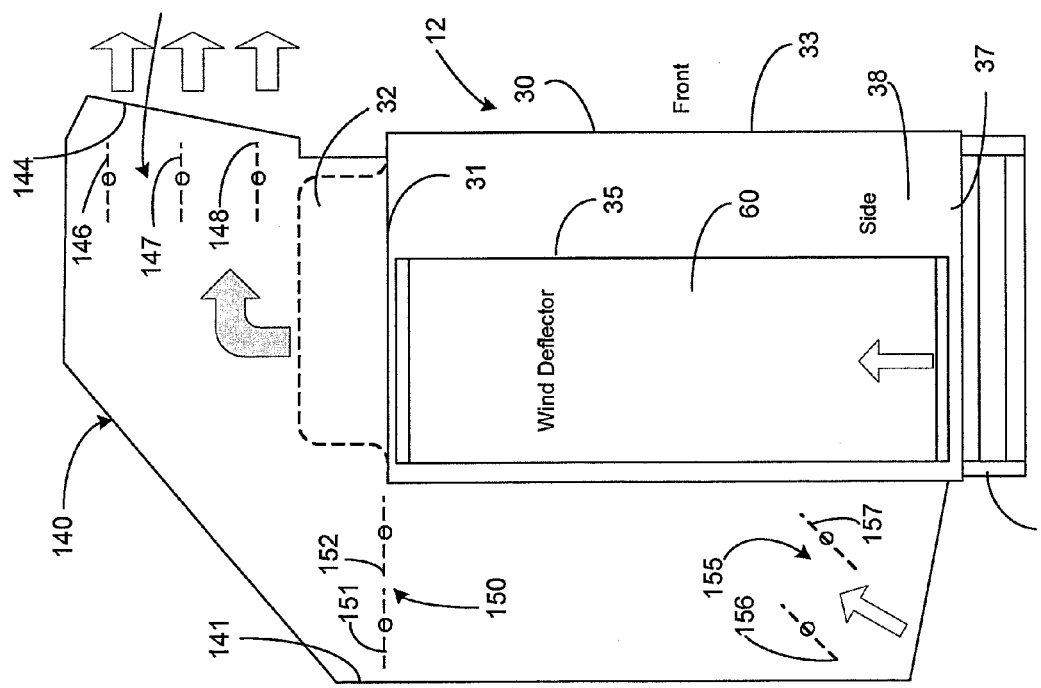

LOW AMBIENT COOLING KIT FOR VARIABLE REFRIGERANT FLOW HEAT PUMP

CROSS-REFERENCE TO RELATED APPLICATIONS

The present application is a divisional application of U.S. patent application Ser. No. 13/207,275, filed Aug. 10, 2011, which is a continuation-in-part application of copending application Ser. No. 12/854,318 filed Aug. 11, 2010, which applications are fully incorporated hereby by reference.

FIELD

The subject matter described herein relates generally to heat pumps and, more particularly, to systems and methods that facilitate low ambient temperature cooling in variable refrigerant flow heat pumps.

BACKGROUND

Heat pump systems used for air conditioning and heating commonly consist of indoor units combined with outdoor units to provide heating and cooling for indoor spaces. Cooling and heating is achieved through a vapor compression cycle. Heat is absorbed from the indoor space (cooling the space) through the indoor unit and discharged to the outdoors at the outdoor unit. Heating is achieved by reversing the cycle. Heat is absorbed from the outside at the outdoor unit and discharged to the inside through the indoor units.

For air-source based heat pumps, the cooling operation tends to become unstable and system capacity starts to drop off as the ambient air temperature drops below a low ambient threshold temperature, e.g., below 23° F. (−5° C.). Wind blowing against the coil surfaces, which tend to be exposed to ambient conditions, can exacerbate the negative affect a drop in ambient air temperature below the low ambient threshold temperature has on system stability and capacity.

Attempts to combat the negative affects of low ambient air temperature and wind have included installing wind guards that actually restrict the airflow to allow a lower outdoor operating temperature. In such designs, however, the restriction tends to be constant which negatively impacts capacity both when cooling at higher outdoor temperatures and during the heating mode.

It is desirable to provide systems and methods that facilitate low ambient air temperature cooling in air-source based heat pump systems.

SUMMARY

Embodiments provided herein are directed to improved systems and methods that facilitate low ambient air temperature cooling in air-source based heat pump systems. In a heat pump system used for air conditioning and heating that comprises indoor units combined with an outdoor unit to provide heating and cooling of indoor spaces, an outdoor heat pump unit preferably includes a discharge hood positionable over the fan and attachable to the top of the enclosure about the fan to capture the fan discharge. The discharge hood preferably includes a damper that is openable and closeable as a function of outside temperature. In addition, the outdoor unit preferably includes wind deflectors attachable to the sides and the back of the enclosure and positioned over the condenser coil openings in the disclosure.

During cooling operations below a low outside air threshold temperature of, e.g., 23° F., the outdoor unit draws air around the tops and bottoms of the wind deflectors and discharges the air out the discharge hood through the damper. This air is drawn across the coil surface of the heat exchanger of the outdoor unit which is under or behind the wind deflectors. The coil surface is warmer than the outdoor air so it gives up heat to the outdoors. Since the air is below the low outside air threshold temperature only a small condenser circuit is active and the condenser fan is operating at its lowest speed. The condensing pressure continues to drop as the outdoor temperature continues to drop further below the low outside air threshold temperature. To maintain a stable condensing pressure, the damper assembly partially closes to a position that is a function of the outdoor ambient temperature. By partially closing the damper assembly and reducing or constricting the opening of the discharge outlet, airflow through the condenser coil of the outdoor unit is reduced even further than enabled by the minimum speed of the fan. As the outdoor temperature continues to drop, the damper assembly continues to close further reducing the airflow. If the load in the indoor space increases, more airflow across the coil is required to still maintain a suitable condensing pressure. In this case the speed of the fan will increase to force more air through the partially closed damper. For varying load conditions, the condensing pressure is tuned or adjusted by varying the speed of the fan.

In another embodiment, the discharge hood includes an integral wind deflector positionable over the coil surface on a back side of the outside unit. The wind deflector can include a second damper assembly positioned adjacent the height of the fan and closed when the outside temperature is above the low outside threshold temperature and opened when the outside temperature is below the low outside threshold temperature to allow discharge air to re-circulate over the coil surface.

In yet another embodiment, the discharge hood and integral wind deflector includes a third damper assembly positioned toward the bottom of the wind deflector. The third damper assembly is open when the outside temperature is above the low outside threshold temperature to enable outside air to circulate over the coil surface and claosed when the outside temperature is below the low outside threshold temperature to prevent the cool outside air from circulating over the coil surface.

Other systems, methods, features and advantages of the example embodiments will be or will become apparent to one with skill in the art upon examination of the following figures and detailed description.

BRIEF DESCRIPTION OF FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 1 is a schematic of a heat pump system used for heating and cooling indoor spaces of a building.

FIG. 2A is a schematic showing the components of a vapor compression cycle of a heat pump system.

FIG. 2B is a schematic showing the principals of heat exchange of a vapor compression cycle of a heat pump system at high ambient conditions.

FIG. 2C is a schematic showing the principals of heat exchange of a vapor compression cycle of a heat pump system at low ambient conditions

FIG. 10 is a side view of the outdoor heat pump illustrating operation of the outdoor heat pump.

FIG. 11 is a side view of the outdoor heat pump illustrating operation of the outdoor heat pump.

FIG. 14 is a schematic of the control box of the discharge hood.

FIGS. 15A and 15B are side views of an alternative embodiment of the outdoor heat pump illustrating operation of the outdoor heat pump.

FIGS. 16A and 16B are side views of an alternative embodiment of the outdoor heat pump illustrating operation of the outdoor heat pump.

It should be noted that elements of similar structures or functions are generally represented by like reference numerals for illustrative purpose throughout the figures. It should also be noted that the figures are only intended to facilitate the description of the preferred embodiments.

DESCRIPTION

Figure 4A:
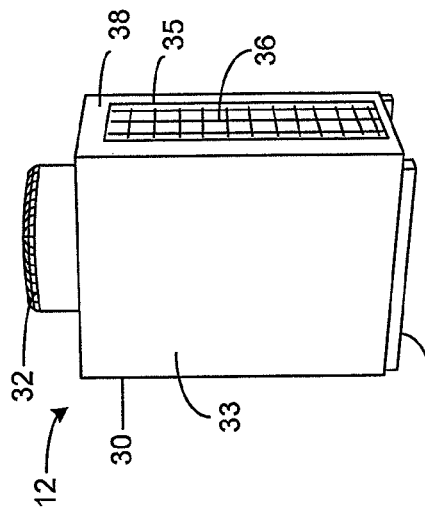
FIG. 4A is a perspective view of the outdoor heat pump sown in FIG. 3.

Each of the additional features and teachings disclosed below can be utilized separately or in conjunction with other features and teachings to systems and methods that facilitate low ambient air temperature cooling in air-source based heat pump systems. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Improved systems and methods are provided that facilitate low ambient air temperature cooling in air-source based heat pump systems. Turning to the figures, FIG. 1 shows a heat pump system 10 used for air conditioning and heating that comprises indoor units 18 and 19 combined with an outdoor unit 12 to provide heating and cooling for indoor spaces 13 of a building 11. As shown, the outdoor unit 12 is coupled through fluid piping 16 to a fluid manifold 14, which is in turn coupled to the various indoor units 18 and 19. Cooling and heating is achieved through a vapor compression cycle. Heat is absorbed from the indoor space 13 (cooling the space) through the indoor units 18 and 19 and discharged to the outdoors at the outdoor unit 12. Heating is achieved by reversing the cycle. Heat is absorbed from the outside at the outdoor unit 12 and discharged to the indoor space 13 through the indoor units 18 and 19.

Alternatively, the system 10 can operate as a heat recovery system which can take heat from indoor spaces 13 using a first set of indoor units 19 for spaces requiring cooling and through the vapor compression cycle, discharge this heat to indoor spaces 13 requiring heat using a second set of indoor units 18. This is called a simultaneous heating and cooling operation.

The components of a vapor compression cycle of a heat pump system 20 are depicted in FIG. 2A. A working fluid, i.e., a refrigerant, in its gaseous state, is pressurized and circulated through the system 20 by a compressor 28. Upon exiting the compressor 28, the refrigerant, which is in a hot and highly pressurized vapor state, is passed through a high temperature heat exchanger 22, commonly referred to as a condenser. The refrigerant is cooled in the heat exchanger 22 until it condenses into a high pressure, moderate temperature liquid. The condensed refrigerant then passes through an expander 24 or pressure-lowering device such as an expansion valve, capillary tube, a turbine or other work extracting device. From the expander 24, the low pressure refrigerant then passes through another heat exchanger 26, a low temperature heat exchanger commonly referred to as an evaporator. Through heat absorption in the evaporator 26, the refrigerant evaporates into a vapor. Upon exiting the evaporator 26, the refrigerant returns to the compressor 28 to repeat the cycle.

Refering to FIGS. 2B and 2C, the principal of operation of the vapor compression cycle of the heat pump system 20 is defined by the expression $\Delta T = T_{Refrigerant} - T_{Ambient}$. The larger $\Delta T$ is, the easier the heat exchange will be. However, the compressor must work harder to gain a large $\Delta T$. For example, the heat pump system 20 might be designed to balance between power consumption at the compressor 28 and the capacity of the condenser 22 at an outside air temperature of 95° F. with a targeting in-room temperature as the goal temperature of the heat pump system 20. If a heat pump system is designed to keep the in-room temperature to 77° F., the targeting in-room temperature is 77° F. The equation above is re-written as follows: $\Delta T = T_{Targeting\ In\text{-}room\ Temperature} - T_{Refrigerant\ Evaporating\ Temperature}$. If the refrigerant evaporating temperature is 50 F, the $\Delta T$ is 27° F. The low outside air threshold temperature is defined as follows: $T_{Low\ Outside\ Air\ Threshold\ Temperature} = T_{Refrigerant\ Condensing Temperature} - \Delta T$. Assuming the refrigerant condensing temperature is also 50° F., the low outside air threshold temperature is 23° F. In a low outside air temperature environment, the compressor 20 must work hard to compress the refrigerant even at 50° F. so that the condenser 22 can perform heat exchange between the refrigerant and the outside air with the temperature of about 23° F.

Figure 4B:
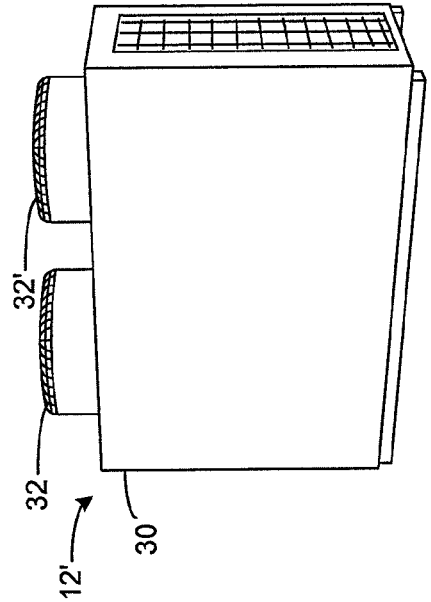
FIG. 4B is a perspective view of an alternative configuration of the heat pump system shown in FIG. 3.
Figure 3:
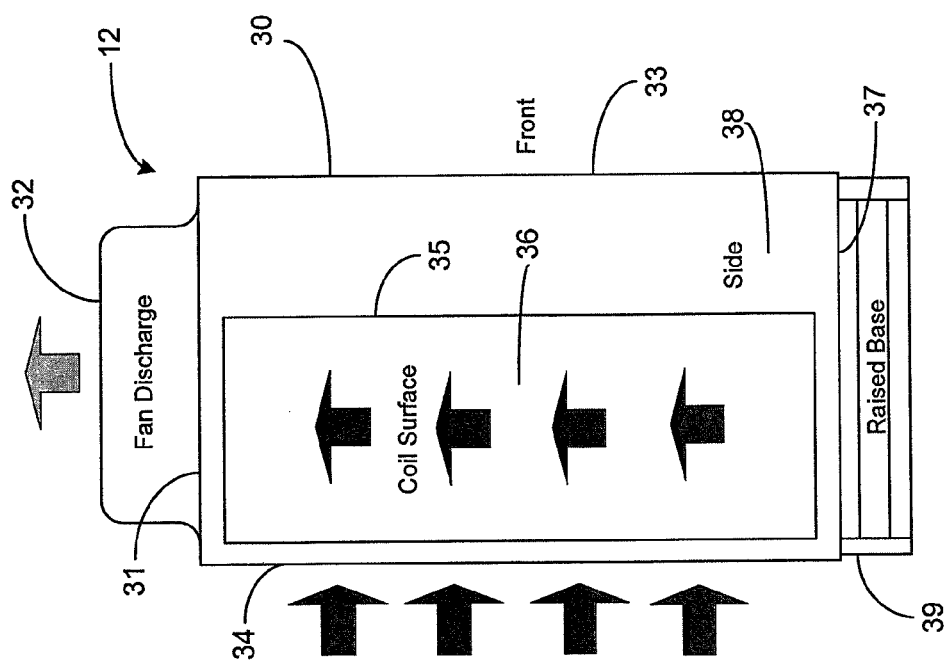
FIG. 3 is a side view of an outdoor heat pump of the heat pump system showin in FIG. 1.

Referring to FIGS. 3 and 4a, the outdoor unit 12 or outdoor heat pump of the heat pump system 10 is shown. As depicted, the outdoor unit 12 includes a box-like enclosure 30 having a front 33, a back 34, sides 38 and a fan 32 mounted on the top 31 of the enclosure 30 and in communication with the interior of the enclosure 30. The fan 32 preferably includes a variable speed outdoor fan motor. In one embodiment, the outdoor unit 12 can include a raised base 39 that extends from the bottom 37 of the enclosure 30. In another embodiment, as depicted in FIG. 4B, an outdoor unit 12' could include two or more fans 32 and 32'.

The outdoor unit 12 further comprises an expander and a compressor coupled to a heat exchanger (see, e.g., FIG. 2). The heat exchanger preferably comprising multi-circuited condenser coils. The outdoor heat pump 12 is preferably a variable refrigerant flow heat pump wherein the compressor is preferably an inverter driven, i.e., variable speed, scroll compressor. Openings 35 formed in the back 34 and sides 38 of the enclosure 30 expose the coil surfaces 36 of the heat exchanger to outdoor ambient conditions.

During normal cooling operation, i.e., operation above approximately 23° F. outdoor ambient air temperature, the outdoor unit 12 draws air through the back 34 and both sides 38, and discharges air out the top 31 of the enclosure 30. The air is drawn across the surface 36 of the condenser coils, which is exposed on three sides, by the fan 32. Because the coil surface 36 is warmer than the outdoor air it gives up heat to the outdoors but still maintains proper pressure of the refrigerant in the system 10 for 100% capacity operation.

Under varying capacity demands and varying outdoor temperatures the outdoor unit 12 has a built-in control logic that opens and closes circuits within the condenser coil and also varies the speed of the fan 32 to maintain a minimum pressure of the refrigerant in the system 10 for stable operation. The lower the temperature outside, the fewer condenser circuits are active and the lower the speed of the fan 32. At, e.g., approximately 23° F. outdoor air temperature, the minimum amount of coil circuits are active and the speed of the fan 32 is at a minimum. As the outdoor air temperature continues to drop, the pressure of the refrigerant in the system also drops, which tends to cause the operation of the system to become unstable and the capacity of the system to start to drop off. Also, wind blowing against the back or side coil surfaces can make this negative impact even more dramatic since the coil surfaces are exposed.

Figure 5:
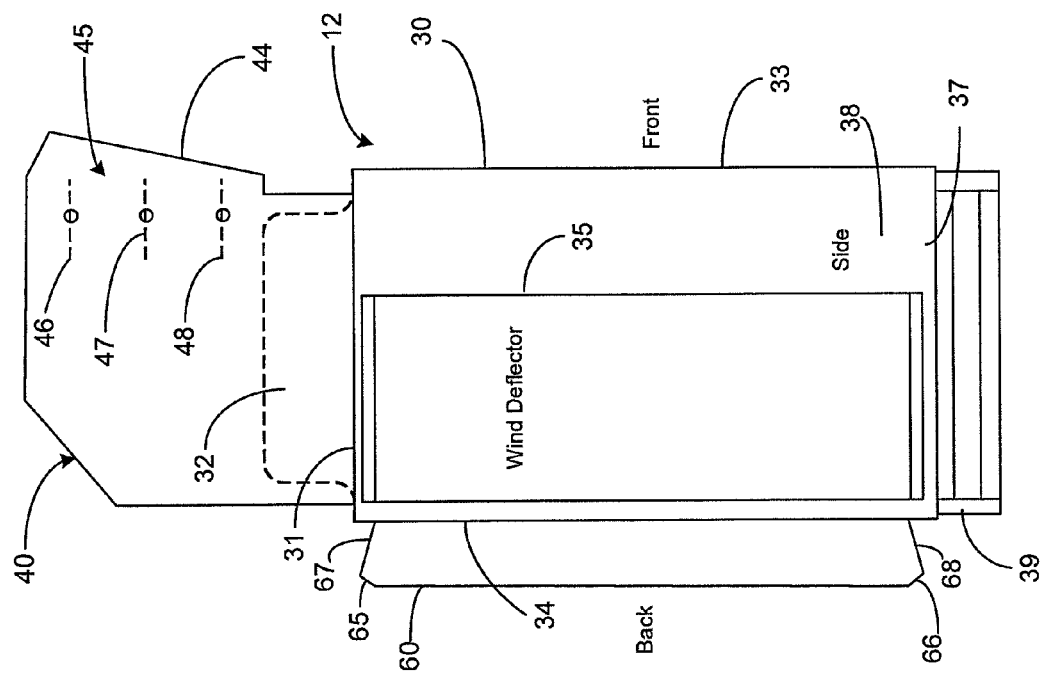
FIG. 5 is a side view of an outdoor heat pump with a discharge hood and wind deflectors.

In order to combat the negative impact of ambient air temperatures dropping a below a low outside air threshold temperature of, e.g., 23° F. and wind on the operation of the system 10, the outdoor unit 12, as depicted in FIG. 5, preferably includes a discharge hood 40 positionable over the fan 32 and attachable to the top 31 of the enclosure 30 about the fan 32 to capture the fan discharge. In addition, the outdoor unit 12 preferably includes wind deflectors 60 attachable to the sides 38 and the back 34 of the enclosure 30 positioned over the coil openings 35. With a discharge hood 40 and wind deflectors 60 installed, the outdoor unit can maintain stable operation below the low outside air threshold temperature of 23° F., preferably down to about −13° F. and, more preferably, down to about −10° F.

Figure 6:
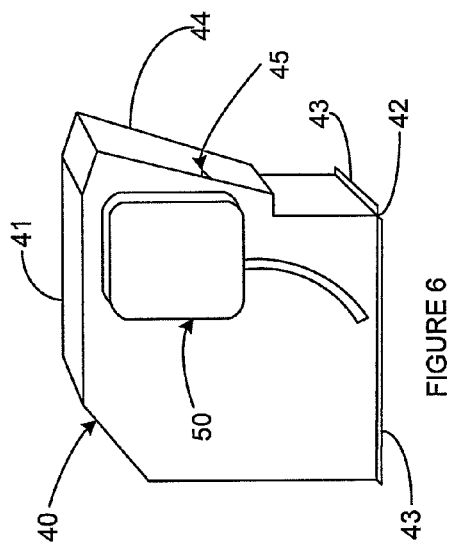
FIG. 6 is a perspective view of the discharge hood.
Figure 7:
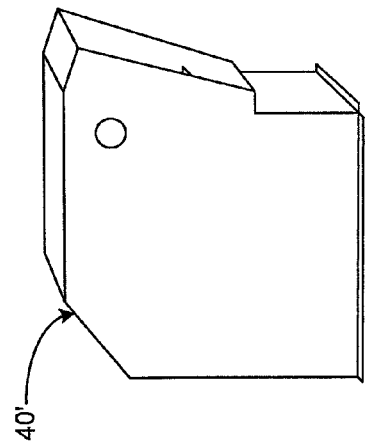
FIG. 7 is a perspective view of an alternative configuration of the discharge hood.

Turning to FIGS. 5 and 6, the discharge hood 40 preferably includes a box like enclosure 41 with a control box 50 mounted on the exterior of the enclosure 41. The enclosure 41 includes an opening 42 at its bottom with mounting flanges 43 disposed about the periphery of the opening 42. The discharge hood 40 includes a discharge outlet 44 on one end or side of the enclosure 41. The hood 40 further includes a damper assembly 45 comprising a series of damper blades 46, 47 and 48 that are rotatably coupled to the enclosure 41 in its interior adjacent the discharge outlet 44. The blades 46, 47 and 48 extend across the outlet 44 and can be rotated to vary the opening of the discharge outlet 44.

Where the outdoor unit 12' comprises two fans 32 and 32', as depicted in FIG. 4B, a second hood 40', as shown in FIG. 7, identical to the first hood 40 with the exception of the control box 50, can be mounted to the enclosure 30 of the outdoor unit 12'. The first and second hoods 40 and 40' are preferably controllable by the control box 50 mounted on the first or master hood 40. The second hood 40' being configured as a slave hood 40' that is controllable by the master hood 40.

Figure 9:
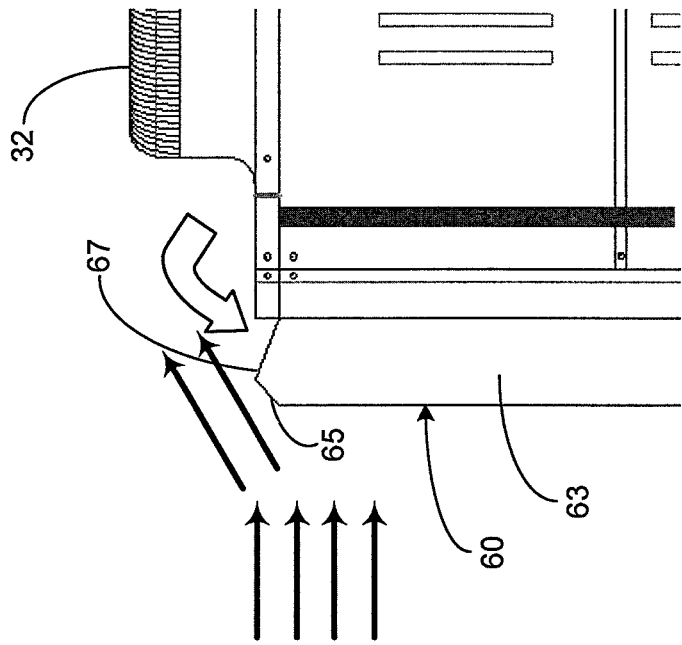
FIG. 9 is a partial side view of a wind deflector mounted on an outdoor heat pump.
Figure 8:
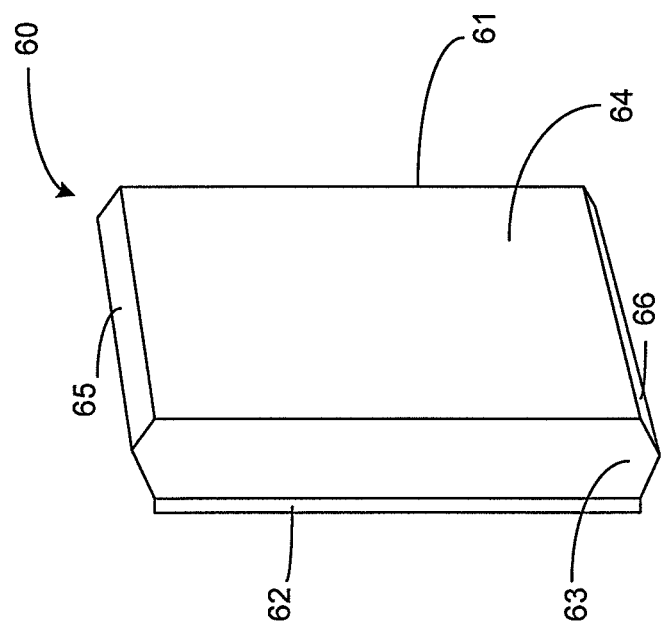
FIG. 8 is a perspective view of a wind deflector.

Turning to FIGS. 8 and 9, the wind deflectors 60 preferably include an open box like body 61 having a face 64 and side 63 panels with mounting flanges 62 extending the length of the side panels 63. Top and bottom plates 65 and 66 extend at an angle from the top and bottom edges of the face panel 64 to a point approximately midway along the top and bottom edges of the side panels 63. When mounted on the enclosure 30 of the outside unit 12, the wind deflectors 60 and the enclosure 30 form air flow openings 67 and 68 positioned at the top and bottom of the wind deflectors 60. In addition to the wind deflectors 60 preventing wind from entering the coil face area within the enclosure 30 of the outdoor unit 12, the special angle of the top and bottom plates 65 and 66 of the wind deflectors 60 forms an air curtain preventing excessive air from blowing up through the bottom opening 68 or down through the top opening 67 of the wind deflectors 60. However, air can still be drawn in as needed by the inverter driven condenser fan 32.

In one embodiment, a low ambient temperature kit can be provided for field installation of a discharge hood and wind deflectors. The kit preferably that includes one or more discharge hoods 40 and one or more wind deflectors 60. Preferably, the kit would include a sufficient number of discharge hoods 40 to cover all the fans 32 of the outdoor unit 12 and a sufficient number of wind deflectors 60 to cover all coil openings in the enclosure 30 of the outdoor unit 12.

Turning to FIGS. 10, 11, 12 and 13, operation of the outdoor unit 12 with a low ambient temperature kit installed is described. During normal operation with the outdoor air temperature above the low outside air threshold temperature, as depicted in FIG. 10, the fan 32 of the outdoor unit 12 draws air around the tops and bottoms of the wind deflectors 60 and discharges air through the open damper 45 (i.e., the damper blades 46, 47 and 48 are horizontally aligned at an angle of 0° to the horizontal or top of the enclosure 31) and out the discharge outlet 44 of the discharge hood 40. The air is drawn across the coil surface which is under or behind the wind deflectors 60. The deflectors 60 are mounted on the back 34 and sides 38 of the unit 12. Because the coil surface is warmer than the outdoor air it gives up heat to the outdoors but still maintains the proper pressure for efficient operation. Above the low outside air threshold temperature in cooling operation, air is not restricted at all by the discharge hood 40. The condensing pressures are maintained by opening and closing sections in the condenser coil and also varying the speed of the fan 32. Above the low outdoor air threshold temperature the operation is the same as if there were no low ambient kit installed.

During cooling operations below the low outside air threshold temperature, as depicted in FIG. 11, the outdoor unit 12 draws air around the tops and bottoms of the wind deflectors 60 and discharges air through the damper 45 and out the discharge outlet 44 of the discharge hood 40. The air is drawn across the coil surface of the heat exchanger which is under or behind the wind deflectors 60. The coil surface is warmer than the outdoor air so it gives up heat to the outdoors. Since the air is below the low outside air threshold temperature only a small condenser circuit is active and the condenser fan 32 is operating at its lowest speed. The condensing pressure continues to drop as the outdoor temperature continues to drop further below the low outside air threshold temperature. To maintain a stable condensing pressure, the damper assembly 45 partially closes to a position that is a function of the outdoor ambient temperature where the blades 46, 47 and 48 are positioned at a predetermined angle to the horizontal. By partially closing the damper assembly 45 and reducing or constricting the opening of the discharge outlet 44, airflow through the condenser coil of the outdoor unit 12 is reduced even further than enabled by the minimum speed of the fan 32. As the outdoor temperature continues to drop, the damper assembly 45 continues to close further reducing the airflow. If the load in the indoor space increases, more airflow across the coil is required to maintain a suitable condensing pressure. In this case the speed of the fan 32 will increase to force more air through the partially closed damper 45. For varying load conditions, the condensing pressure is tuned or adjusted by adjusting the speed of the fan 32

Figure 12:
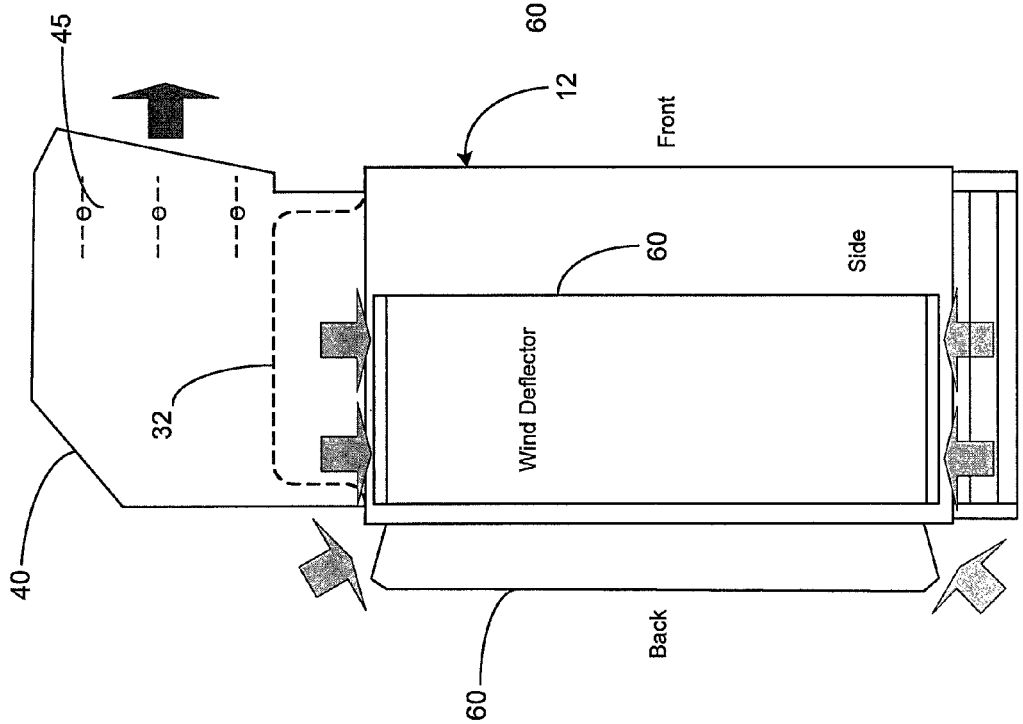
FIG. 12 is a side view of the outdoor heat pump illustrating operation of the outdoor heat pump.

During heating operation, as depicted in FIG. 12, the outdoor unit 12 coil is colder than the outdoor temperature. As air is drawn across the coil, heat is absorbed from this air. The result is the air discharged through the damper assembly 45 is colder than the incoming air. For a heat pump to operate efficiently in heating mode, the air through the coil of the outdoor unit must be unobstructed. The damper control box assembly 50 is interlocked with the outdoor unit reversing valve 70 (see FIG. 14). When the unit 12 switches into heating mode (energizes the reversing valve 70) a relay 55 in the damper control box 50 is energized. This relay 55 breaks power to the damper actuator control circuit 50, deenergizing the actuator motor 52. The motor 52 has a spring return feature that drives it to the full open position. This interlocking relay function assures that the damper 45 will be wide open during the heating mode allowing full airflow and full capacity.

Figure 13:
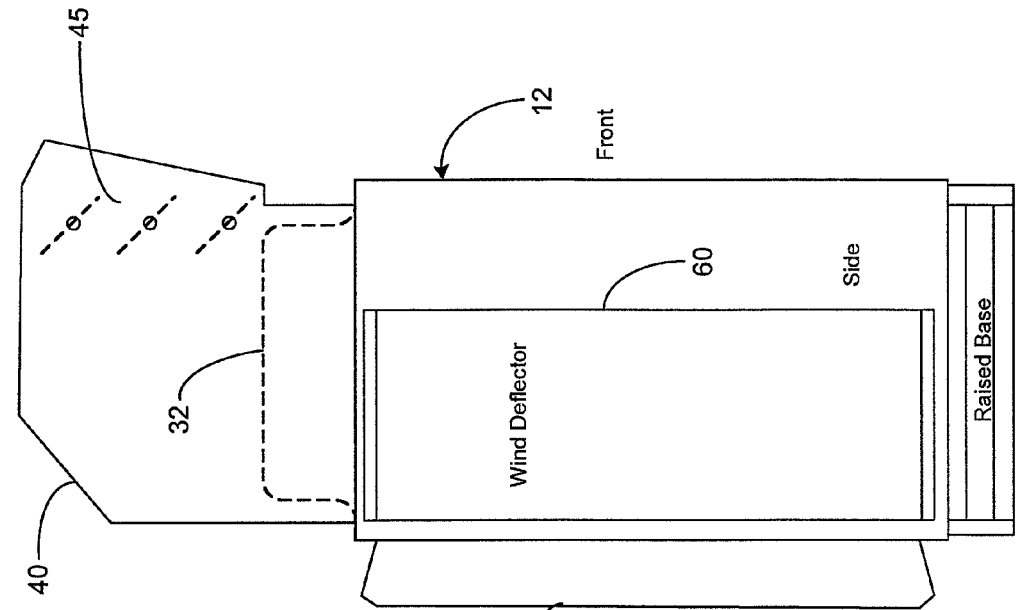
FIG. 13 is a side view of the outdoor heat pump illustrating operation of the outdoor heat pump.

When the unit 12 is operating in heating mode, frost and/or ice will build up on the fin surfaces 36'of the heat exchanger and needs to be occasionally removed by means of a defrost cycle. As depicted in FIG. 13, this is accomplished by shutting off the outside fan 32 entirely and switching the reversing valve 70. By switching the reversing valve 70, the unit is now in essence running in the cooling mode. The coil is now being heated from the energy left in the indoor units and piping.

The control box 50 views this as a cooling mode and the damper 45 will partially close down to a position equal to what it would be in cooling mode for the outside ambient air temperature. For example, if it was 5° F. outside and the unit was operating in cooling, the damper may be closed 50%. Now if the unit is in defrost mode the control box 50 reacts as if it were in cooling and the damper 45 is closed to 50%. The action of the damper 45 closing during defrost and the wind deflectors 60 protecting the coil from wind will increase defrost efficiency and thus shorten the length of defrost cycle. Shorter defrost cycles will yield an overall increased heat output.

Turning to FIG. 14, the control box 50 includes a weather tight enclosure 51, a damper actuator 52 mounted to a control board 57 within the enclosure 51, a circuit board 53 coupled to the damper actuator 52, a control transformer 54 coupled to the circuit board 53, an interlock relay 55 coupled to the control transformer 54, and a thermistor 56 coupled to the circuit board 53 and extending through the enclosure 51 to the outside. The damper actuator 52 preferably comprises a motor that turns a shaft of the damper assembly 45 based on a control input. The turning of the damper shaft causes the damper 45 to either open or close. The input that causes the motor to move is preferably a control voltage signal within a control voltage signal range having upper and lower threshold voltages such as, e.g., a control voltage range of 2-10 volt DC. Between the lower and upper threshold voltages, e.g., 2 and 10 volts, is the control range. At the lower threshold voltage, the motor starts to move. At the upper threshold voltage, the motor has reached its full stroke or range of movement. The actuator 52 preferrably has a range of motion between 0° and 90°. Preferably, at a 0° angle, the damper 45 is fully open. At a 90° angle the damper 45 preferably would be fully closed. In a preferred embodiment, however, the damper 45 does not totally close. The furthest the motor will be allowed to turn the shaft of the damper 45 would be to angle position less than 90° such as, e.g., an 85° angle position, which leaves the damper 45 partially open such as, e.g., approximately 5-6% open. This limit is programmed into the circuit board 53.

The relay 55 has a normally closed contact. Any time the outdoor unit 12 is in cooling mode power is allowed to flow through the contact, allowing the damper 45 to operate by closing down as the outdoor temperature drops and opening up as the outdoor temperature rises. The colder it gets, the further the damper 45 closes.

The main purpose of the relay 55 is to allow the damper 45 to spring return to a full open position when and if the unit 12 operates in a heating mode. The reversing valve 70 will be energized when the unit 12 goes into heating mode. The relay 55 is tied into the control board 57 at the connection for the reversing valve 70. This energizes the coil of the relay 55, opening the contact. When the contact opens power is disconnected from the transformer 54, which de-energizes the control board 57 and power to the damper actuator 52. The damper 45 then spring returns to full open position to allow full airflow through the outdoor unit 12 for full heating capacity.

When the unit 12 is operating in heating and a demand for defrost is required the reversing valve 70 deenergizes. This de-energizes the relay 55. The damper 45 is now allowed to operate in cooling mode, i.e., go to a partially closed position based on the outdoor temperature.

The resistance of the thermistor 56 changes based on the outside temperature. The thermistor 56 protrudes through the bottom of the control box 50 so that it can sense the outdoor ambient temperature. The circuit board 53 receives a resistance value of the thermistor 56 corresponding to the outside temperature.

The circuit board 53 is designed to take the resistance value from the thermistor 56 and convert it to a control voltage within a control voltage range such as, e.g., 2-10 volt DC output voltage, to control the position of the damper actuator 52. In response to the control voltage received, the damper actuator 52 rotates the damper 45 to a predetermined angle corresponding to the input voltage. At or below the lower threshold voltage, e.g., 2 volts DC, which corresponds to outside temperatures at or above an upper threshold control temperature such as, e.g., 23° F., the actuator motor will retain the damper in the fully open position (i.e., at a 0° angle to the horizontal). As the DC voltage increases in accordance with a drop in outside temperature, the damper actuator 52 will rotate the damper 45 toward a closed position. Since it is preferred not to fully close the damper 45 (at a damper angle of 90°, the damper is 100% closed), the closed position of the damper 45 is preferably limited to a damper angle less than 90° such as, e.g., an angel of 85°, which corresponds to a control voltage signal input limit of less than 10 volts DC such as, e.g., 9.56 volts DC. Thus, at or above the upper threshold voltage, e.g., 9.56 volts DC, which corresponds to outside temperatures at or below a lower threshold control temperature such as, e.g., 3° F., the actuator motor will retain the damper 45 in the closed position.

The programming of the circuit board 53 also has a built in hysteresis or differential so that the damper 45 does not move back and forth continuously based on very slight temperature fluctuations. Instead the circuit board 53 is programmed to cause the damper actuator 52 to operate or move in steps. As the outside temperature cools below a threshold temperature, the actuator 52 does not move the damper 45 toward a partially closed angle until the temperature reaches a close point temperature. As the outside air temperature continues to cool, the actuator 52 does not move the damper 45 toward a further partially closed angle until the temperature reaches the next close point temperature. For example, as the outside air temperature drops below 21° F., the damper 45 remains at an angle of 10° from horizontal until the air temperature drops to 18° F. wherein the damper 45 closes more by rotating to an angle opening of 25° from horizontal. Similarly, as the outdoor temperature begins to warm, the actuator 52 does not move the damper 45 toward a less partially closed angel until the temperature reaches an open point temperature. For example, as the air temperature warms from 3° F., the damper 45 remains at an angle of 70° from horizontal until the air temperature reaches 7° F. wherein the damper 45 rotates to an angle opening of 55° from horizontal. This allows stable operation of the damper assembly 45 without a continuous hunting back and forth motion.

Turning to FIGS. 15A and 15B, in an alternative embodiment an outdoor unit 12 includes a discharge hood 140 with an integral wind deflector 141. The discharge hood 140 includes a discharge outlet 144 and a damper assembly 145 comprising a series of damper blades 146, 147 and 148 that are rotatably coupled to the discharge hood 140 in its interior adjacent the discharge outlet 144. The blades 146, 147 and 148 extend across the outlet 144 and can be rotated to vary the opening of the discharge outlet 144. The discharge hood 140 and integral wind deflector 141 can include a second damper assembly 150 comprising a series of damper blades 151 and 152 that are rotatably coupled to the wind deflector 141 in its interior adjacent the level of the fan 32 and an opening of the wind deflector 141 into the discharge hood 140. As discussed below, when the outside temperature is low, the damper blades 146, 147 and 148 adjacent the discharge outlet 144 can be moved to a closed position and the damper blades 151 and 152 in the wind deflector can be moved to an open position so that most of the discharged air from the fan will be turned back to the coil surface 36 without going out from the hood 140. In this configuration, the outside unit 12 performs heat exchange with the discharged air from the outside unit 12 which is warmer than the outside air. This enables the condensing temperature to be higher and the workload of the compressor to be lighter.

During normal operation with the outdoor air temperature above the low outside air threshold temperature, as depicted in FIG. 15A, the fan 32 of the outdoor unit 12 draws air around the tops and bottoms of the wind deflectors 60 on the sides of the unit 12 and around the bottom of the wind deflector 141 of the discharge hood 140 on the back of the unit 12, and discharges air through the open damper 145 (i.e., the damper blades 146, 147 and 148 are horizontally aligned at an angle of 0° to the horizontal or top of the enclosure 31) and out the discharge outlet 144 of the discharge hood 140. The air is drawn across the coil surface which is under or behind the wind deflectors 60 and 141. As shown, damper assembly 150 is closed (i.e., the damper blades 151 and 152 are horizontally aligned at an angle of 0° to the horizontal or top of the enclosure 31) to insure the air is drawn across the coil surface which is under or behind the wind deflector 141 of the discharge hood. Because the coil surface is warmer than the outdoor air it gives up heat to the outdoors but still maintains the proper pressure for efficient operation. Above the low outside air threshold temperature in cooling operation, air is not restricted at all by the discharge hood 140. The condensing pressures are maintained by opening and closing sections in the condenser coil and also varying the speed of the fan 32. Above the low outside air threshold temperature the operation is the same as if there were no low ambient kit installed.

During cooling operations below the low outside threshold temperature, as depicted in FIG. 15B, the outdoor unit 12 draws air around the tops and bottoms of the wind deflectors 60 on the side of the unit 12 and around the bottom of the wind deflector 141 of the discharge hood 140 on the back of the unit 12 and discharges air through the damper 145 and out the discharge outlet 144 of the discharge hood 140. The air is drawn across the coil surface of the heat exchanger which is under or behind the wind deflectors 60 and 141. The coil surface is warmer than the outdoor air so it gives up heat to the outdoors. Since the air is below the low outside air threshold temperature only a small condenser circuit is active and the condenser fan 32 is operating at its lowest speed. The condensing pressure continues to drop as the outdoor air temperature continues to drop further below the low outside air threshold temperature. To maintain a stable condensing pressure, the damper assembly 145 partially closes to a position that is a function of the outdoor ambient air temperature where the blades 146, 147 and 148 are positioned at a predetermined angle to the horizontal and the damper assembly 150 opens where the blades 151 and 152 are positioned at a predetermined angle to the horizontal.

Turning to FIGS. 16A and 16B, in another alternative embodiment an outdoor unit 12 includes a discharge hood 140 with an integral wind deflector 141. The discharge hood 140 includes a discharge outlet 144 and a damper assembly 145 comprising a series of damper blades 146, 147 and 148 that are rotatably coupled to the discharge hood 140 in its interior adjacent the discharge outlet 144. The blades 146, 147 and 148 extend across the outlet 144 and can be rotated to vary the opening of the discharge outlet 144. A second damper assembly 150 comprising a series of damper blades 151 and 152 that are rotatably coupled to the wind deflector 141 in its interior adjacent the level of the fan 32. A third damper assembly 155 comprising a series of damper blades 156 and 157 that are rotatably coupled to the wind deflector 141 in its interior adjacent an opening at the bottom of the wind deflector 141. As discussed below, when the outside temperature is low, the damper blades 146, 147 and 148 adjacent the discharge outlet 144 and damper blades 156 and 157 adjacent the opening of the wind deflector 141 can be moved to a closed position and the damper blades 151 and 152 in the wind deflector can be moved to an open position so that most of the discharged air from the fan will be turned back to the coil surface 36 without going out from the hood 140. In this configuration, the outside unit 12 performs heat exchange with the discharged air from the outside unit 12which is warmer than the outside air. This enables the condensing temperature to be higher and the workload of the compressor to be lighter.

During normal operation with the outdoor air temperature above the low outside air threshold temperature, as depicted in FIG. 16A, the fan 32 of the outdoor unit 12 draws air around the tops and bottoms of the wind deflectors 60 on the sides of the unit 12 and around the bottom of the wind deflector 141 of the discharge hood 140 on the back of the unit 12, and discharges air through the open damper 145 (i.e., the damper blades 146, 147 and 148 are horizontally aligned at an angle of 0° to the horizontal or top of the enclosure 31) and out the discharge outlet 144 of the discharge hood 140. The air is drawn across the coil surface which is under or behind the wind deflectors 60 and 141. As shown, the damper assembly 150 is closed (i.e., the damper blades 151 and 152 are horizontally aligned at an angle of 0° to the horizontal or top of the enclosure 31) and the damper assembly 155 is open (i.e., the damper blades 156 and 157 are oriented at an angle to insure maximum air flow) to insure the air is drawn across the surface which is under or behind the wind deflector 141 of the discharge hood 140. Because the coil surface is warmer than the outdoor air it gives up heat to the outdoors but still maintains the proper pressure for efficient operation. Above the low outside air threshold temperature in cooling operation, air is not restricted at all by the discharge hood 140. The condensing pressures are maintained by opening and closing sections in the condenser coil and also varying the speed of the fan 32. Above the low outside air threshold temperature the operation is the same as if there were no low ambient kit installed.

During cooling operations below the low outside air threshold temperature, as depicted in FIG. 16B, the outdoor unit 12 draws air around the tops and bottoms of the wind deflectors 60 on the sides of the unit 12 and around the bottom of the wind deflector 141 of the discharge hood 140 on the back of the unit 12 and discharges air through the damper 145 and out the discharge outlet 144 of the discharge hood 140. The air is drawn across the coil surface of the heat exchanger which is under or behind the wind deflectors 60 and 141. The coil surface is warmer than the outdoor air so it gives up heat to the outdoors. Since the air is below the low outside air threshold temperature only a small condenser circuit is active and the condenser fan 32 is operating at its lowest speed. The condensing pressure continues to drop as the outdoor temperature continues to drop further below the low outside air threshold temperature. To maintain a stable condensing pressure, the damper assembly 145 partially closes to a position that is a function of the outdoor ambient air temperature where the blades 146, 147 and 148 are positioned at a predetermined angle to the horizontal, the damper assembly 150 opens where the blades 151 and 152 are positioned at a predetermined angle to the horizontal, and the damper assembly 155 closes where the blades 151 and 152 are positioned at a predetermined angle.

Alternatively, a damper assembly could be positioned at the base of the fan 32 eliminating the discharge hood.

Figure 17:
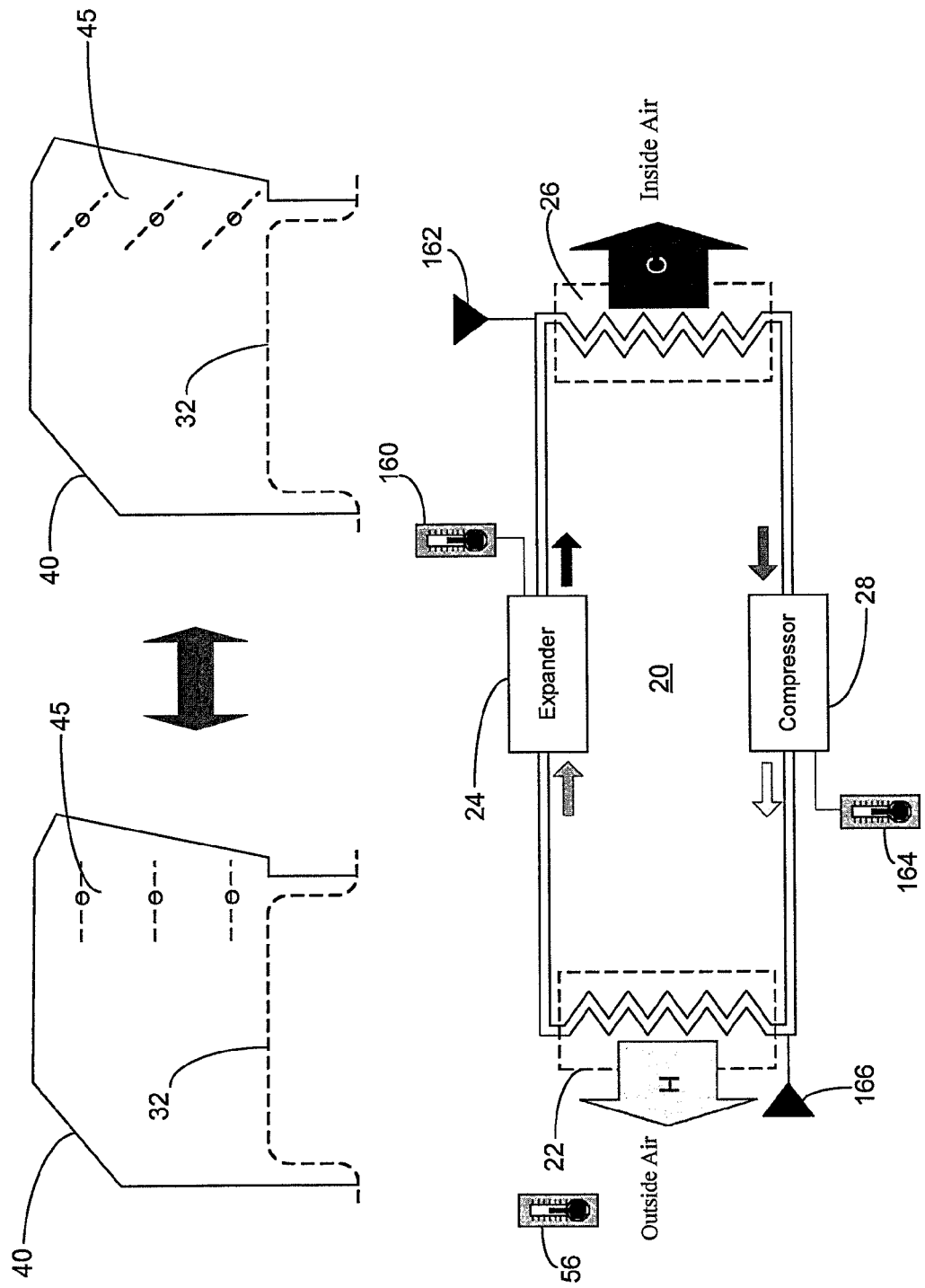
FIG. 17 is a schematic showing the components of a vapor compression cycle with various tempature and pressure sensors.

Turning to FIG. 17, as an alternative to the thermister 56 used to measure the outside temperature, the control system 50 could include one of a variety of other sensors. For example, the control system 50 could include an evaporating temperature sensor 160 located after the expander 24, a low pressure sensor 162 located on the low pressure side of the compressor, a condensing temperature sensor 164 located after the compressor 28, or a high pressure sensor 166 located on the high pressure side of the compressor 28.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed:

1. A method of defrosting a condenser coil contained within a heat exchanger of an outdoor heat pump unit coupled to one or more indoor units,
   the outdoor heat pump unit including:
      an enclosure having side and back panels with openings,
      a condenser fan mounted on a top of the enclosure and in communication with an interior of the enclosure, the condenser fan configured to draw air in through the openings in the side and back panels of the enclosure and across a heat exchanger positioned within the interior of the enclosure,
      a discharge hood mounted on the top of the enclosure and above the condenser fan, the discharge hood including a discharge outlet, and
      a damper mounted adjacent the discharge outlet of the discharge hood and configured to adjust an amount of air flowing through the opening of the discharge outlet based on outside ambient air temperature,
   the method comprising steps of:
      providing the outdoor heat pump unit with a plurality of wind guards and reducing flow of outside air toward the condenser coil,
      turning off the condenser fan,
      reversing a flow of refrigerant from the indoor units through the condenser coil from a refrigerant flow direction corresponding to a heating operation to a refrigerant flow direction corresponding to a cooling operation, and
      partially closing the damper down to a position equal to that for the damper in the cooling operation based on the ambient air temperature.

2. The method of claim 1, wherein the step of reversing the flow of refrigerant includes deenergizing a reversing valve.

3. The method of claim 2, wherein the outdoor heat pump unit further comprises a motor for rotating the damper based on an input and the method further comprises a step of closing, when a demand for defrost is required, a relay for opening and closing a circuit that supplies electrical power to a damper motor to move the damper to a direction to be closed.

4. The method of claim 1, wherein one of the plurality of wind guards is integrally formed with the discharge hood.

5. The method of claim 1, further comprising a step of providing the outdoor heat pump unit with the discharge hood and the damper by installing the discharge hood and the damper onto the outdoor heat pump unit from a package of parts separate from the heat pump unit.

6. The method of claim 1, wherein the outdoor heat pump unit further comprises a motor for rotating the damper based on an input, and the input includes a control voltage signal for operating the motor within a control voltage signal range having lower and upper control voltage thresholds.

7. A method of defrosting a condenser coil contained within a heat exchanger of an outdoor heat pump unit coupled to an indoor unit and including an enclosure housing a heat exchanger and having side and back panels with openings, a condenser fan mounted on a top of the enclosure and in communication with an interior of the enclosure, the condenser fan creating an airflow from an exterior of the enclosure across the heat exchanger, the method of defrosting the condenser coil comprising:

providing a discharge hood mounted on top of the enclosure and above the condenser fan, the discharge hood including a discharge outlet and a damper mounted adjacent the discharge outlet of the discharge hood and adjusting airflow through the opening of the outlet based on outside ambient air temperature, turning off the condenser fan, reversing a flow of refrigerant from the indoor unit through the condenser coil from a refrigerant flow direction corresponding to a heating operation to a refrigerant flow direction corresponding to a cooling operation, and partially closing the damper down to a position equal to that for the damper in the cooling operation based on the ambient air temperature.

8. The method of claim 7, wherein the step of providing the outdoor heat pump unit with the discharge hood and the damper includes installing the discharge hood and the damper onto the outdoor heat pump unit contained in a package of parts separate from the heat pump unit.

\* \* \* \* \*